United States Patent [19]

Olson

[11] Patent Number: 4,639,974

[45] Date of Patent: Feb. 3, 1987

[54] THIGH DEBONER

[75] Inventor: Harold D. Olson, Smyrna, Ga.

[73] Assignee: Cagle's Inc., Atlanta, Ga.

[21] Appl. No.: 751,076

[22] Filed: Jul. 2, 1985

[51] Int. Cl.$^4$ ............................................. A22C 17/04
[52] U.S. Cl. .......................................... 17/46; 17/11;
17/1 G
[58] Field of Search .................. 17/1 G, 11, 11 D, 46

[56] References Cited

U.S. PATENT DOCUMENTS

| | | | |
|---|---|---|---|
| 3,296,653 | 1/1967 | Segur | 17/11 |
| 3,402,423 | 9/1968 | Helgeson et al. | 17/1 G |
| 3,456,284 | 7/1969 | Werner et al. | 17/46 X |
| 3,533,128 | 10/1970 | Brown et al. | 17/46 X |
| 3,672,000 | 6/1972 | Martin et al. | 17/11 |
| 3,866,271 | 2/1975 | McNeil | 17/46 X |
| 4,068,350 | 1/1978 | Van Appledorn | 17/1 G |
| 4,216,565 | 8/1980 | Volk et al. | 17/46 X |
| 4,377,884 | 3/1983 | Visclosi | 17/11 |
| 4,402,112 | 9/1983 | Gasbarro | 17/11 |
| 4,495,675 | 1/1985 | Hill et al. | 17/16 |

FOREIGN PATENT DOCUMENTS

| | | | |
|---|---|---|---|
| 027333 | 2/1985 | Japan | 17/46 |
| 84/00471 | 2/1984 | PCT Int'l Appl. | 17/46 |
| 2150416A | 7/1985 | United Kingdom | 17/46 |

Primary Examiner—Willie G. Abercrombie
Attorney, Agent, or Firm—Thomas & Kennedy

[57] ABSTRACT

A plurality of wires (16a–16h) are each connected at one one to an oscillating ring 14, with the other ends of the wires connected to springs 18a–18h. When the ring 14 is rotated in one direction, the wires move closer to the longitudinal axis (28) of the ring. The bone of a poultry thigh is grasped by a grasping member (48) and is pulled through the polygon shape formed by the wires. The wires tend to wrap around the poultry bone (54), and as the bone is pulled between the wires, the wires strip the meat from the bone (FIGS. 7-12).

10 Claims, 12 Drawing Figures

THIGH DEBONER

BACKGROUND OF THE INVENTION

1. Field of the Invention

The present invention relates to a method and apparatus for removing edible meat from bones, wherein the meat is stripped longitudinally of its bone. More particularly, the invention relates to the method and apparatus of deboning uncooked poultry thighs, whereby an enlarged knuckle at the end of the bone of the thigh is gripped and pulled longitudinally, and in the meantime a plurality of wires arranged to form a polygon about the bone are moved so as to close about the bone, thereby cutting through the meat to reach the bone, so that as the thigh bone is drawn through the wires, the wires strip the meat from the bone.

2. Description of the Prior Art

When preparing poultry for consumption in the retail market, such as at fast food restaurants, it has become desirable to serve the meat with the bones removed. Deboned meat can be used in sandwiches and in other conditions where it is desirable not to have to remove the bone during the eating process.

In the past, various automated procedures have been developed for stripping the meat from the thigh bones of poultry, whereby one of the enlarged knuckles at the ends of the thigh bone are grasped and pulled while the movement of the meat is restrained from movement. This results in the meat being stripped away from the bone. For example, U.S. Pat. Nos. 3,672,000 and 4,495,675 disclose equipment that includes two pairs of blades that are used in the meat stripping process. One pair of blades closes about the enlarged knuckle of the thigh bone, then the second pair of blades closes about the bone at a position adjacent the first pair of blades, and then the pairs of blades are moved apart along the length of the bone with the second pair of blades scrapping along the length of the bone and stripping the meat from the bone.

The raw meat has a tendency to adhere to the bone along the length of the bone, and the removal thereof usually results in a tearing or shearing of the meat adjacent the bone. The blades that scrape along the length of the bone usually do not conform to the shape of the bone, therefore the blades tend to leave meat adhering to the bone where the blades did not fit the bone. Also, the rather rigid blades sometimes tend to gouge into the bone, causing bone chips to be removed with the meat, and occasionally the bones will crack during the stripping process, especially at a position adjacent one of the knuckles at the ends of the bones. This leaves bone fragments in the stripped meat, which, if not later removed, can be dangerous to the ultimate consumer that expects to receive a completely deboned product.

SUMMARY OF THE INVENTION

Briefly described, the present invention provides an improved method and apparatus for deboning raw poultry thighs and similar uncooked meat products with a reduced hazard of having bone chips and fragments retained in the meat. One end of the bone of a poultry thigh is placed in a gripping device, and a plurality of wires under tension are wrapped partially about the thigh so that the wires tend to cut through the meat toward the bone. The gripping members then pull the bone along its length, and the wires permit the passage of the bone but restrain the movement of the meat with the bone, thereby stripping the meat from the bone.

The flexible wires tend to conform to the curvature of the bone as the bone is moved between the wires, so that the wires tend to contact the full circumferential surface of the bone. This tends to avoid leaving strips of meat along the length of the bone, even when the cross sectional shape of the bone is somewhat irregular. As the second knuckle of the bone approaches the wires, the wires tend to ride over the knuckle so that the meat at the second knuckle is stripped away from the bone. When the bone is pulled completely through the wires, the wires tend to merge together at the end of the bone to close the opening through which the bone travelled, thereby completely stripping the meat from the bone. If a large number of wires are used in the apparatus to strip meat from the bone, less wrapping of each wire about the bone is required and less force is required to be applied by each wire to strip the meat away from the bone.

Thus, it is an object of this invention to provide an improved method and apparatus for deboning raw poultry thighs and similar meat products without engaging the bone with a blade or other hard object that is likely to form bone fragments that are carried with the meat product.

Another object of this invention is to provide an improved method and apparatus for deboning uncooked poultry thighs by engaging the bone with several elements at different circumferential positions about the bone so as to assure engagement of the entire circumference of the bone and then drawing the bone through the elements, whereby substantially the entire meat product is stripped from the bone.

Another object of this invention is to provide an improved method and apparatus for increasing the yield in a poultry deboning procedure and for reducing the hazard of forming bone chips that can be carried with the meat product.

Other objects, features and advantages of the present invention will become apparent upon reading the following specification, when taken in conjunction with the accompanying drawings.

DETAILED DESCRIPTION

Figures 1, 2:
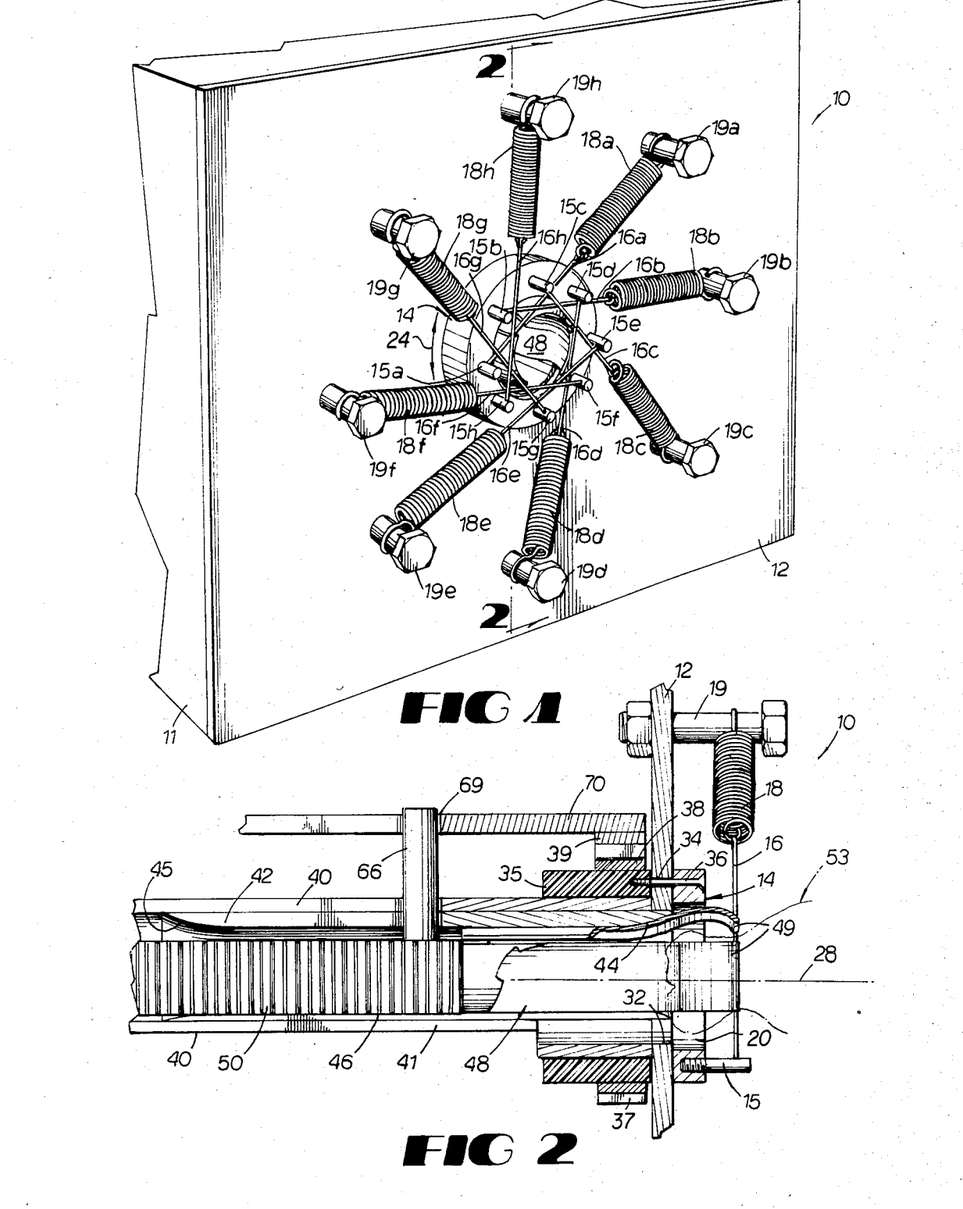
FIG. 1 is a perspective illustration of the face of the housing of the thigh deboner.
FIG. 2 is a partial side elevational view of the face plate portion of the thigh deboner, taken along lines 2—2 of FIG. 1.

Referring now in more detail to the drawings, in which like numerals indicate like parts throughout the several views, FIG. 1 illustrates thigh deboner 10 that is substantially enclosed in housing 11. The elements on the front panel 12 of the housing are illustrated as being exposed, but it will be understood that most of the elements illustrated normally would be located behind a protective shield so as to protect the operator of the equipment from injury.

Front panel 12 normally is oriented in an upright attitude, and rotatable wire support ring 14 is mounted to the front panel and protrudes outwardly therefrom. A plurality of wire support pins 15 are threaded into internally threaded bores (not shown) at equally spaced positions about wire support ring 14. For example, eight such wire support pins 15a-15h are illustrated and can be used in the practice of the invention. A wire 16 is attached at one of its ends to each of the wire support pins 15. Each wire 16a-16h is connected as its other end to a coil tension spring 18a-18h, and each spring 18 is connected to a bolt 19 threaded into an internally threaded opening (not shown) in the face of front panel 12. The bolts 19a-19h are equally spaced circumferentially about wire support ring 14. The wires and bolts are arranged so that the wires are maintained in tension by the springs 18, and so that the wires stretch across the central opening 20 of the wire support ring 14. With this arrangement, each wire must cross over at least one other wire.

It will be noted in FIG. 1 that each wire crosses four other wires as it extends from its wire support pin 15 to its bolt 19. For example, wire 16a crosses wire 16b, 16c, 16g and 16h. With this arrangement, wires 16a-16h make up a polygon 21 in front of the central opening 20 of the wire support ring 14. The wires are staggered slightly to be arranged in different planes so that excessive friction of one wire against another is avoided. If the wires are approximately 1/32 of an inch in diameter then they are staggered approximately 1/32 of an inch apart. The wires are made from stainless steel.

Figure 5:
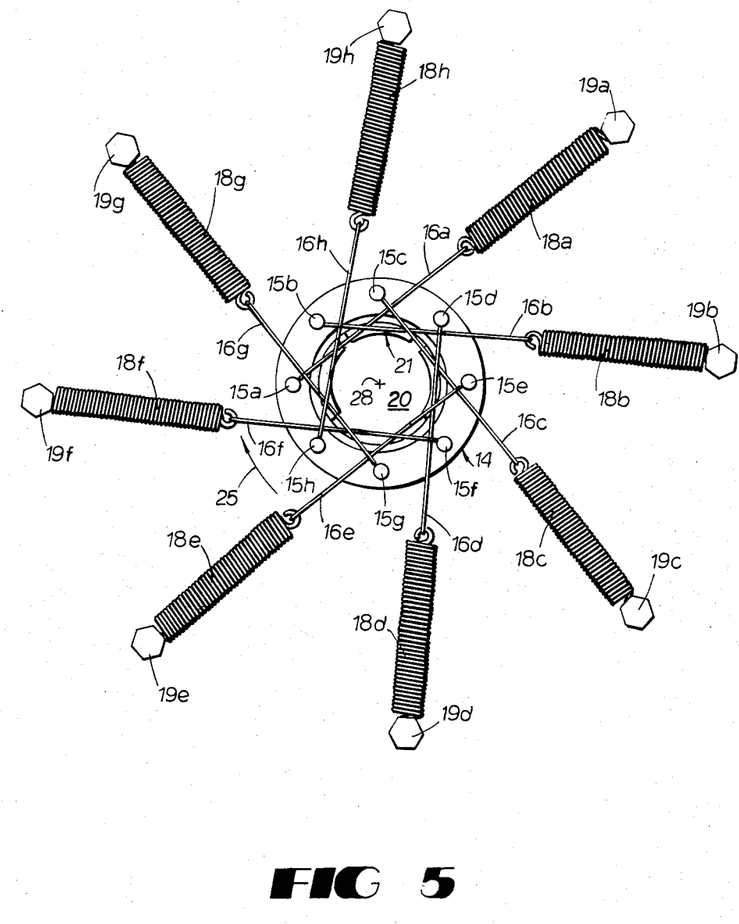
FIG. 5 is an illustration of the wire support ring and its wires and springs, showing the wires in their open position.
Figure 6:
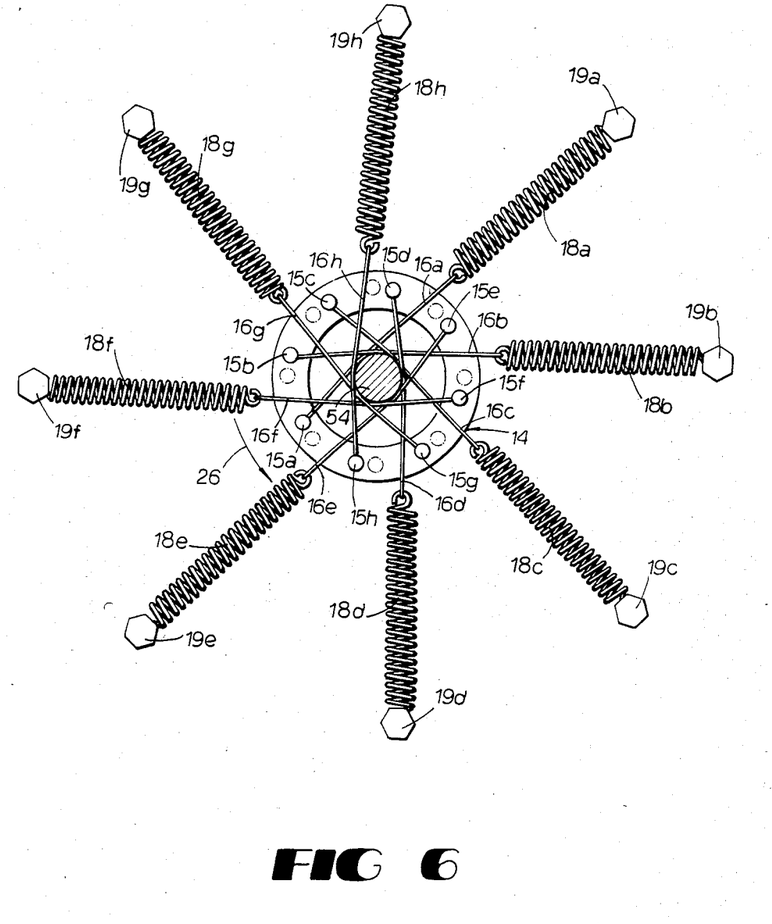
FIG. 6 is an illustration of the wire support ring and its wires and springs, similar to FIG. 5, but showing the wires in their closed position and extending about a poultry thigh bone.

As indicated by double headed direction arrow 24 in FIG. 1, rotatable wire support ring 14 oscillates about its central opening 20. As illustrated in FIG. 5, the rotatable wire support ring 14 has been rotated in a clockwise direction as indicated by direction arrow 25 to its "open position" in which the polygon 21 formed by the wires in front of wire support ring 14 is relatively large and open; however, as illustrated by FIG. 6, wire support ring 14 can be rotated in a counter clockwise direction as indicated by arrow 26 so that the wire support pins 15 move in a counter clockwise direction to move the wires 16a-16h closer to the center or longitudinal axis 28 of wire support ring 14. If an object such as the thigh bone 54 of a poultry thigh is located within the polygon 21, the wires 16a-16h will tend to wrap around the poultry thigh bone, with the span of wire engaging the poultry thigh bone 54 tending to conform to the shape of the portion of the thigh that it engages.

For example, wire support pin 15a for wire 16a will move from the position indicated in FIG. 5 to the position indicated in FIG. 6, causing the wire 16a to bend about and to partially wrap about poultry thigh bone 54. Likewise, wire support pins 15b-15h will carry the ends of the wires 16b-16h in a circular path, causing the wires 16b-16h to partially wrap around thigh bone 54. In the meantime, coil tension springs 18a-18h permit a slight longitudinal movement of each of the wires 16a-16h, respectively, so that the proper tension is maintained in each wire as the wire wraps about the thigh bone 54. This applies some slicing movement between each wire and the poultry part positioned in the center of the wire support ring, tending to cause the wires to cut through the meat and reach the bone 54 of the poultry part.

As illustrated in FIG. 2, an opening 32 is formed in front panel 12, with the opening being coaxial with the central opening 20 of wire support ring 14. Also, several arcuate slots 34 (only one shown) are formed in front panel 12, with the slots extending circumferentially and coaxially about the longitudinal axis 28 of wire support ring 14. Cylindrical bearing 35 is oriented coaxially with longitudinal axis 28 on the opposite side of front panel 12 of the housing, and screws 36 extend through openings in wire support ring 14, through arcuate slots 34 and are threaded into bearing 35 so as to mount the bearing and wire support ring to front panel 12, with the arcuate slots permitting these elements to rotate with respect to front panel 12. Spur gear 38 is mounted to the outer convex surface of bearing 35, and rack 39 has its downwardly facing teeth in engagement with the outwardly facing teeth 37 of the spur gear. When rack 39 moves longitudinally (FIG. 3), spur gear 38, bearing 35 and wire support ring 14 rotate about longitudinal axis 28.

Figure 3:
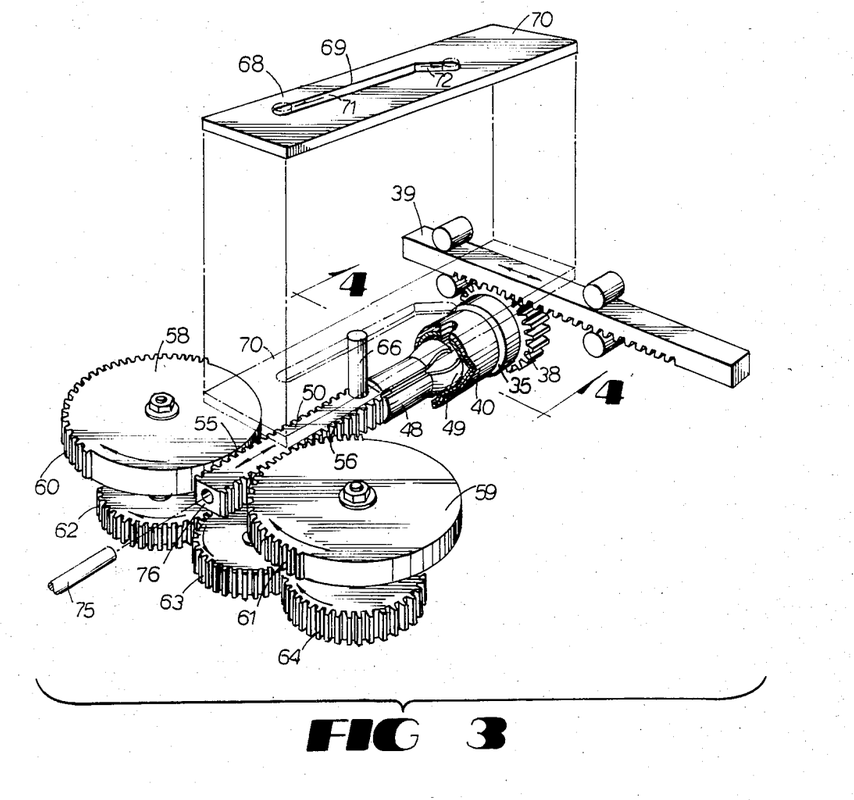
FIG. 3 is an exploded perspective illustration of a portion of the thigh deboner, illustrating how the drive mechanism reciprocates the bone grasping elements and how the wire support ring is rotated.
Figure 4:
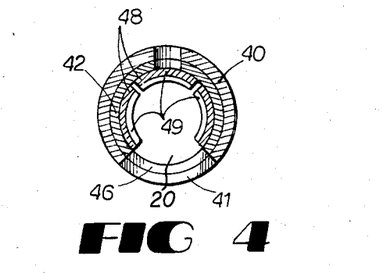
FIG. 4 is a detailed illustration of the cam sleeve, taken along lines 4—4 of FIG. 3.

As illustrated in FIGS. 2, 3 and 4, stationary guide tube 40 is rigidly mounted to front panel 12, and bearing 35 oscillates about the guide tube. Guide 40 extends coaxially with respect to the longitudinal axis 28 of wire support ring 14, and extends internally from the inside surface of front panel 12. Longitudinal slot 41 is formed through the lower portion of guide tube 40, with the slot beginning adjacent bearing 35 and extending rearwardly to the end of guide tube 40.

Cam sleeve 42 (FIGS. 2 and 4) is mounted inside and extends longitudinally with respect to guide tube 40. Cam sleeve 42 includes an outwardly tapered, conical cam surface 44 at the end of the cam sleeve adjacent front panel 12, and a similar outwardly tapered conical cam surface 45 at its opposite end. A longitudinal slot 46 is formed longitudinally along the lower portion in cam sleeve 42 and is aligned with the longitudinal slot 41 of guide tube 40.

As illustrated in FIGS. 1-4 and 7-12, grasping member 48 is positioned in alignment with and interiorally of guide tube 40 and cam sleeve 42. Grasping member 48 includes a plurality of clamp elements 49 arranged about the opposite sides and over the longitudinal axis 28 which are supported in a cantilever arrangement at the end of rack 50. Each clamp element is attached at its base to the end of rack 50 and slopes outwardly from the longitudinal axis 28 and engages the interior face of cam sleeve 42. The distal ends of the clamp elements 49 are curved inwardly so as to form a gripping surface that is suitable for engagement about the enlarged knuckle 51 or 52 of a thigh bone 54.

The rack 50 has teeth 55 and 56 on opposite surfaces thereof. Spur gears 58 and 59 also have teeth 60 and 61 that are arranged to engage the teeth 55 and 56 of rack 50. Gears 62, 63 and 64 have their teeth in engagement with each other, with gear 62 and 64 connected by a bolt to gears 58 and 59, and with gear 63 interposed as an idler. A motor (not shown) drives one of the gears 62-64, and the inner engagement of the teeth of these gears causes the gears to be driven in opposite directions of rotation, as indicated by the direction arrows.

Figure 7:
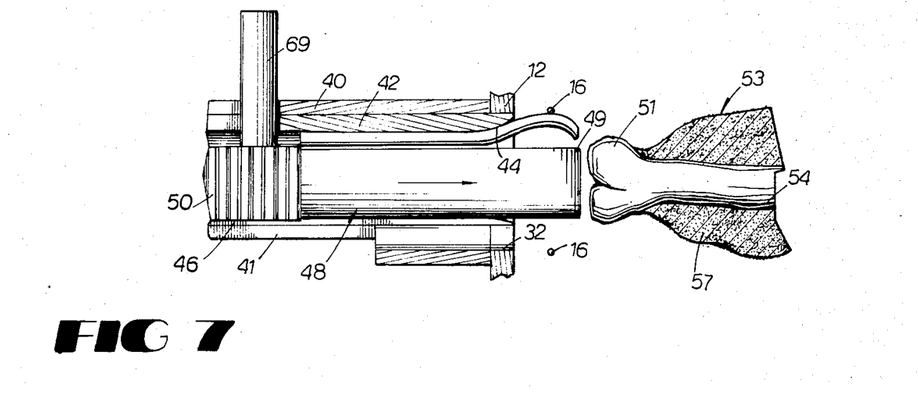
FIG. 7 is a detail illustration of the bone grasping element as it moves to a position to grasp the knuckle of a thigh bone.
Figure 8:
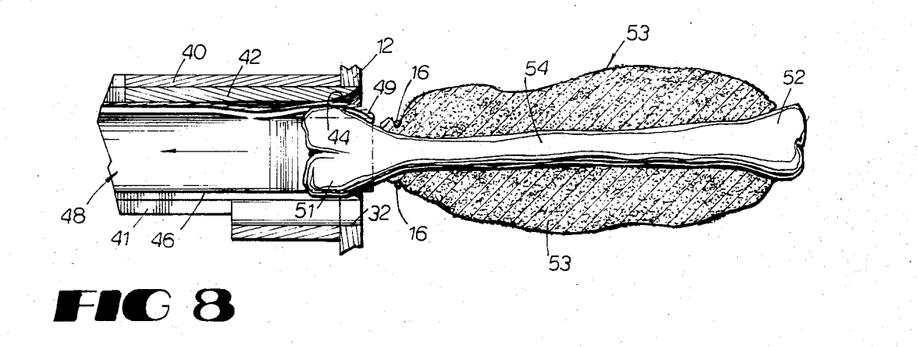
FIGS. 8, 9, 10, 11 and 12 are progressive illustrations, similar to FIG. 7, but showing how the knuckle of a thigh bone is grasped, the wires closing about the knuckle, and then the bone being pulled so as to pass through the cutting wires, the meat being stripped away from the bone, and the bone being ejected from the grasping element.

As illustrated in FIG. 3, the teeth 60 and 61 of the upper gears 58 and 59 are interrupted for more than one-half of the circumference of each of the gears, and the teeth are arranged so that the teeth 60 of gear 58 will engage the teeth 55 of rack 50 when the teeth 61 of the opposite gear 59 are out of engagement with the teeth 56 of rack 50, and vice versa. Therefore, when the teeth 61 engage its teeth 56 of rack 50, the grasping member 48 will be moved toward wire support ring 14, and when the gear 59 has been rotated far enough so that its teeth no longer engage rack 50, the teeth 60 of gear 58 will engage rack 50 to begin the retraction of grasping member 48, thereby moving the grasping member away from wire support ring. This is a reciprocating movement of the grasping member 48, so that the grasping member moves from a protruding position as illustrated in FIGS. 1, 2 and 7, progressively toward a retracted position as illustrated in FIGS. 8-12.

When the clamp elements 49 of grasping member 40 are moved through wire support ring 14 to their protruding position (FIGS. 1 and 7), the clamp elements will move adjacent the outwardly tapered cam surface 44 of cam sleeve 42, allowing the outwardly biased resilient force of the clamp elements to permit the clamp elements to separate and form a larger grasping receptacle for receiving the enlarged knuckle portion 51 or 52 of the thigh bone 54. When the grasping member is moved in the opposite direction so that it moves inwardly away from the wire support to move toward each other into clamping relationship about the knuckle 51 or 52 of a thigh bone 54, tending to pull the thigh bone into the thigh deboner.

As illustrated in FIG. 3, cam pin 66 is rigidly mounted to rack 50 and extends upwardly therefrom. Cam guide plate 68 is mounted in a horizontal plane above rack 50 and defines a cam slot 69 therein. The edge portion 70 of cam guide plate 68 adjacent front panel 12 is rigidly mounted to the top surface of rack 39, and therefore is moveable in lateral directions in unison with the rack. Cam pin 66 protrudes upwardly through cam slot 69. The rear portion 71 of cam slot 69 extends parallel to the length of rack 50, but the forward portion 72 of cam slot 69 is angled to one side. With this arrangement, when rack 50 is moved by gear 59 in a direction toward front panel 12, cam pin 66 rides through cam slot 69, and cam guide plate remains stationary. When cam pin 66 reaches the angled forward portion 72 of cam slot 69, the cam pin 66 urges cam guide plate 68 in a lateral direction. This causes rack 39 to also move in the same lateral direction, and rack 39 rotates spur gear 38 in a corresponding direction. Wire support ring 14 rotates in unison with spur gear 38, and this causes the polygon 21 formed by the wires 16a-16h to change in size.

OPERATION

When the thigh deboner 10 is operated, the motor (not shown) rotates gears 58 and 59 (FIG. 3). When the teeth of gear 59 engage the teeth of rack 50, grasping member 48 will be driven toward wire support ring 14 until the gap in the teeth 61 moves adjacent the teeth of the rack 50, whereupon further movement is terminated. As the rack 50 moves in this direction, its cam pin 66 moves along the longitudinal rear portion 71 of cam slot 69 and eventually reaches the angled forward portion 72 of slot 69, whereupon cam guide plate 68 is urged laterally and moves rack 39 laterally. This lateral movement of rack 39 rotates spur gear 38 and wire support ring 14.

When the wire support ring is rotated in this manner, the wire support pins 15 are rotated in a circular path from the positions illustrated in FIG. 6 to the positions illustrated in FIG. 5, which causes the polygon formed by the wires 16a-16h to increase in size. In the meantime, the clamp elements 49 of grasping member 48 reach the outwardly tapered cam surface 44 of cam sleeve 42, permitting the clamp elements to spread apart from one another.

When the wires are spread to their open position as illustrated in FIG. 5 and when the clamp elements 49 are spread apart, the operator moves a poultry thigh 53 (FIG. 7) into engagement with the grasping member, urging the knuckle 51 between the clamp elements 49.

When rack 50 begins its movement so as to withdraw the clamp elements 49 from wire support ring 14, the cam surface 44 urges clamp elements 49 together, so that the clamp elements engage and grasp the enlarged knuckle portion 51 of the thigh bone 54. In the meantime, this rearward movement of the rack 50 also moves cam pin 66 rearwardly, causing cam guide plate 68 to move laterally and rotate wire support ring 14. Rotation of the wire support ring 14 causes the wire support pins 15 to move in a circular path so as to partially wrap each wire 16a-16h about the thigh 53. Coil tension springs 18a-18h permit the wires 16a-16h to move longitudinally the distance necessary to permit wire support ring 14 to rotate while maintaining the proper tension on the wires. This causes the wires to slice inwardly with respect to the meat 57 on the thigh bone 54.

It is desirable that the wires 16a-16h engage the portion of the thigh 53 that is immediately adjacent grasping member 48. Therefore, the wires 16 converge inwardly with respect to the distal end portions of the clamp elements 59, and may actually engage the clamp elements (FIG. 9) as they move into engagement with the thigh 53. Of course, further movement of grasping member 48 causes the wires 16 to slip off the tapered outer ends of the clamp elements 49 and into wrapped engagement about thigh 53, and the slight slicing longitudinal movements of the wires 16 causes the wires to cut into and through the meat until the wires reach the bone 54.

Figure 9:
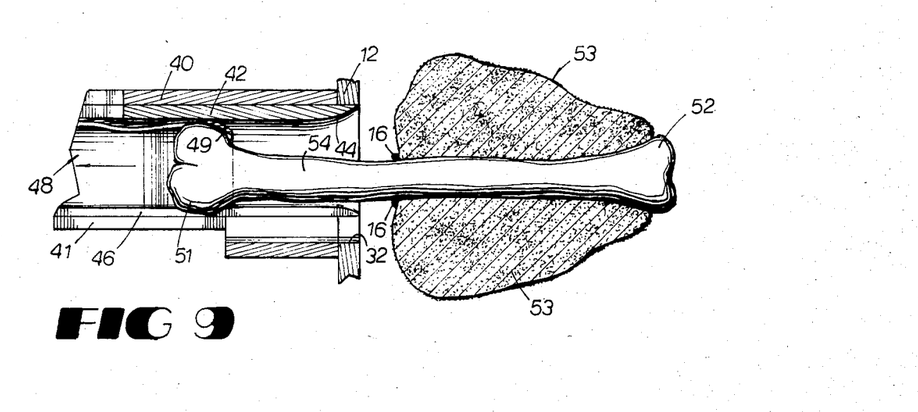
Figure 10:
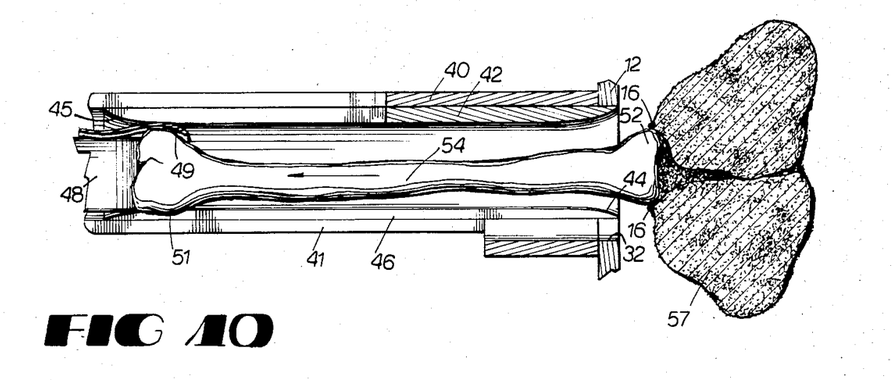

As the rack 50 is moved further inwardly away from wire support ring 14, wires 16 remain in position (FIG. 6), and as the bone 54 is drawn further into the machine, the wires 16 permit the bone to pass on between the wires as the wires ride over the surface of the bone. In the meantime, the wires tend to conform to the surface of the bone and strip or scrape the meat 57 from the bone 54 (FIG. 9).

Figure 11:
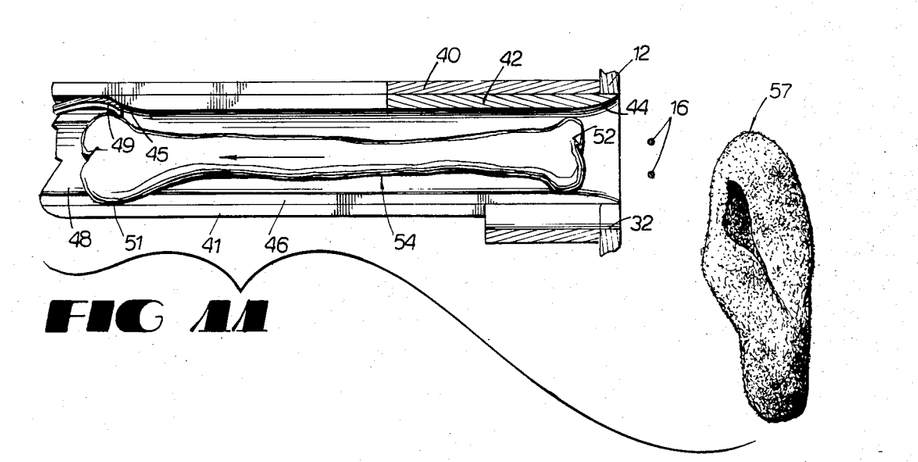

As the grasping member 48 approaches the opposite end of cam sleeve 42 (FIG. 10) the knuckle 52 at the other end of thigh bone 54 will reach wires 16. The wires tend to ride over the enlarged knuckle 16 while maintaining contact with the bone entirely about the circumference of the bone, so that all of the meat, even the meat surrounding the knuckle 52, is scraped from the bone. When the bone is drawn further into the machine, the wires 16 will pass over the knuckle 52, completely severing the meat 57 from the bone (FIG. 11).

Figure 12:
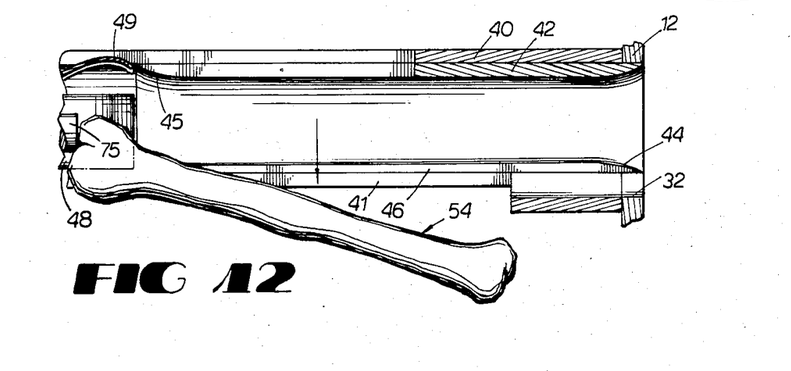

After the meat has been completely separated from the bone, the clamp elements 49 reach the cam surface 45, permitting the clamp elements 49 to spread apart and release the bone 54. The bone 54 tends to drop downwardly through the aligned slots 41 and 46 of guide tube 40 and cam sleeve 42 (FIG. 12). In the event that the bone 54 tends to cling to the clamp elements 49, stationary protrusion 75 is mounted so as to be received in longitudinal opening 76 extending through rack 50, and when clamp elements 49 have been moved out of cam sleeve 42 they move far enough so that protrusion 75 protrudes into the socket formed by the clamp elements 49, thereby abutting the adjacent end of thigh bone 54 and dislodging the thigh bone from the clamp elements.

While the invention has been disclosed as utilizing wire cutting elements that are maintained under tension and that are partially wrapped about the thigh bone, it will be understood that other type elements can be utilized to cut through the meat to reach the thigh bone. For example, other strand material such as nylon and other plastic synthetics can be utilized. Moreover, while eight wire elements have been described in the embodiment disclosed herein, other numbers of wire elements can be utilized, as long as enough wire elements, such as at least three wire elements, are used so as to form a geometric shape that can surround and then conform to the surface of the thigh bone.

Although the invention has been described in the form of a preferred embodiment, many modifications, additions, and deletions, may be made thereto without departure from the spirit and scope of the invention, as set forth in the following claims.

I claim:

1. A method of removing meat from an elongated bone of a poultry part or the like comprising the steps of:
    at least partially wrapping the poultry part with an intermediate portion of a length of flexible wire under yieldable tension by positioning one end portion of the poultry part in a central portion of a polygon formed by a plurality of flexible wires under yieldable tension, moving the wires to reduce the size of the polygon until all the wires engage the poultry part and the individual wires bend about the poultry part, and
    moving the poultry part and wire with respect to each other so that the bone moves along the bone's longitudinal axis transverse to the length of the wire.

2. The method of claim 1 and wherein the step of moving the wires to reduce the size of the polygon comprises moving one end portion of each wire simultaneously in a circular path about the poultry part.

3. A method of removing meat from an elongated bone of a poultry part or the like comprising the steps of: positioning one end portion of the poultry part in a central portion of a polygon formed by a plurality of wires, applying yieldable spring tension to one end of each wire, moving one end of each wire in a path to reduce the size of the polygon until the wires engage the poultry part and bend about the poultry part, and cutting with at least some of the wires through the meat until the wires reach the bone.

4. A method of removing meat from an elongated bone of a poultry part or the like comprising the steps of:
    positioning one end portion of an elongated bone of a poultry part in a central portion of a polygon-shaped opening formed by a plurality of wire elements,
    moving the bone along the length of the bone's longitudinal axis through the opening,
    moving the wire elements to reduce the size of the opening until the wire elements engage the bone of the poultry part and bend about the bone so that the shape formed by the bent portions of the wire elements tends to conform to the cross sectional shape of the bone and strip the meat from the bone as the bone is moved.

5. The method of claim 4 and wherein the step of moving the bone along the length of the bone's longitudinal axis comprises grasping the one end portion of the bone with at least two clamping elements, and wherein the step of moving the wire elements to reduce the size of the opening comprises engaging the poultry part with the wire elements to cut through the meat and contact the bone at a position immediately adjacent the clamping elements so as to strip as much of the meat from the bone as practically possible.

6. The method of claim 4 and wherein the step of reducing the size of the opening comprises individually applying yieldable tension force to one end of each wire and simultaneously moving one end of each wire in a circular path about the central portion of the opening that reduces the size of the opening.

7. The method of claim 4 and further including the step of applying yieldable tension individually to each of said wires and enlarging the opening formed by the wires about the bone in response to a knuckle or other enlarged portion of the bone moving through the opening.

8. Apparatus for removing meat from a poultry bone or the like comprising:
    a wire support ring defining a central opening,
    several flexible wire members each having one end portion connected to said wire support ring and its other end portion anchored at a position outside said wire support ring,
    means for moving an elongated poultry bone along the length of the bone's longitudinal axis through said wire support ring, and
    means for rotating said wire support ring about the central opening of said ring in a direction to move intermediate portions of said wire members closer to the center of the central opening of said wire support ring in timed relationship with the movement of the poultry bone so that the wire members close about the poultry bone as the poultry bone is moved through the wire support ring and the wire members bend about the poultry bone and strip the meat from the poultry bone.

9. The apparatus of claim 8 and further including spring means connected to each of said wire members for applying tension to said wire members.

10. The apparatus of claim 8 and wherein said several wire members comprise at least three wires, yieldable biasing means attached to each said wire and stretching each wire across at least one adjacent wire to form with the wires a polygon of smaller breadth than the central opening of said wire support ring.

* * * * *